(12) United States Patent
Goto et al.

(10) Patent No.: US 10,411,271 B2
(45) Date of Patent: Sep. 10, 2019

(54) SEPARATOR SUPPORTING STRUCTURE

(71) Applicant: HONDA MOTOR CO., LTD., Minato-ku, Tokyo (JP)

(72) Inventors: Shuhei Goto, Wako (JP); Kosuke Takagi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 30 days.

(21) Appl. No.: 15/897,309

(22) Filed: Feb. 15, 2018

(65) Prior Publication Data

US 2018/0241050 A1 Aug. 23, 2018

(30) Foreign Application Priority Data

Feb. 20, 2017 (JP) ................................. 2017-028619

(51) Int. Cl.
*H01M 8/00* (2016.01)
*H01M 8/0247* (2016.01)
*H01M 8/0221* (2016.01)
*H01M 8/0206* (2016.01)
*H01M 8/247* (2016.01)
*H01M 8/1018* (2016.01)

(52) U.S. Cl.
CPC ....... *H01M 8/0247* (2013.01); *H01M 8/0206* (2013.01); *H01M 8/0221* (2013.01); *H01M 8/247* (2013.01); *H01M 2008/1095* (2013.01); *H01M 2250/20* (2013.01); *Y02T 90/32* (2013.01)

(58) Field of Classification Search
CPC ........... H01M 8/0247; H01M 2250/20; H01M 8/0221; H01M 2008/1095; H01M 8/247; H01M 8/0206; Y02T 90/32
See application file for complete search history.

(56) References Cited

U.S. PATENT DOCUMENTS

| 2008/0102344 | A1* | 5/2008 | Shimizu | .................. B29C 70/84 |
| | | | | 429/483 |
| 2014/0106254 | A1* | 4/2014 | Yamano | .............. H01M 8/2465 |
| | | | | 429/465 |
| 2016/0072145 | A1 | 3/2016 | Martinchek et al. | |
| 2016/0285124 | A1 | 9/2016 | Martinchek et al. | |

* cited by examiner

*Primary Examiner* — Cynthia H Kelly
*Assistant Examiner* — Monique M Wills
(74) *Attorney, Agent, or Firm* — Amin, Turocy & Watson LLP

(57) ABSTRACT

A separator supporting structure includes a metal lug provided on a separator, a set of protrusions that protrude from an inner surface of a metal casing toward the separator to form a recess into which the lug is inserted, a first insulating portion covering the lug at least in the recess, and a second insulating portion extending from the first insulating portion and between the separator and each of the protrusions.

9 Claims, 5 Drawing Sheets

SEPARATOR SUPPORTING STRUCTURE

CROSS-REFERENCE TO RELATED APPLICATION

This application is based upon and claims the benefit of priority from Japanese Patent Application No. 2017-028619 filed on Feb. 20, 2017, the contents of which are incorporated herein by reference.

BACKGROUND OF THE INVENTION

Field of the Invention

The present invention relates to a separator supporting structure for supporting a metal separator for fuel cells relative to a metal casing housing the fuel cells.

Description of the Related Art

A fuel cell stack having a fuel cell stack body formed of a stack of multiple fuel cells and a metal casing that houses the fuel cell stack body is known. In the fuel cell stack, a metal separator for the fuel cells is supported on the casing by a separator supporting structure (see U.S. Patent Application Publication Nos. 2016/0285124 and 2016/0072145, for instance).

The separator supporting structure has a metal tab protruding to the outer periphery side from the separator and molded with resin material, and a pair of protrusions protruding to the separator side from the inner surface of the casing and forming a recess into which the tab with resin material is inserted. On the inner surface of the casing, insulator is provided so as to surround the fuel cell stack body.

SUMMARY OF THE INVENTION

A drawback of a conventional separator supporting structure is high manufacturing cost associated with an insulator surrounding the fuel cell stack on the inner surface of the casing. If the insulator on the inner surface of the casing is eliminated for cost reduction, exposed metal portions of the protrusions and the exposed metal portion of the separator may contact or approach each other when an external load is applied to the casing to cause the fuel cells to swing (tilt) relative to the protrusions. If this happens, an appropriate insulation distance (a space distance) for insulating between the protrusions and the separator cannot be ensured and thus insulation between the casing and the separator may not be ensured.

The present invention has been made in view of the drawback and an object thereof is to provide a separator supporting structure that can ensure insulation between the casing and the separator even when an external load is applied to the casing, while keeping the cost low.

To attain the object, the present invention provides a separator supporting structure for supporting a metal separator for fuel cells to a metal casing housing the fuel cells, the separator supporting structure including: a metal lug provided on the separator so as to protrude outwardly from an outer periphery of the separator; a set of protrusions that protrude from an inner surface of the casing toward the separator to form a recess into which the lug is inserted; a first insulating portion covering the lug at least in the recess; and a second insulating portion extending from the first insulating portion and between the separator and each of the protrusions.

With this configuration, due to the second insulating portion, there will be a larger space between the exposed metal portion of each protrusion and that of the separator when an external load is applied to the casing to cause the fuel cells to swing relative to the protrusions, compared to a case where the second insulating portion is not present. Thus, an appropriate insulation distance can be ensured between the protrusions and the separator even when the fuel cells swing relative to the protrusions. Accordingly, insulation between the casing and the separator can be ensured. In addition, the cost can be kept low since the area of coverage with an insulator can be small compared to when an insulator is provided on the inner surface of the casing.

In the separator supporting structure, the first insulating portion may cover a protrusion-end side of the lug, and the second insulating portion may cover a proximal side of the lug and part of an edge of the separator.

With this configuration, insulation between the casing and the separator can be ensured more reliably.

In the separator supporting structure, the lug may be joined to the separator.

With this configuration, the material for the outer periphery of the separator that is removed during manufacture of the separator can be decreased, so the material cost can be reduced.

In the separator supporting structure, in the second insulating portion, surfaces that face the protrusion ends of the protrusions may be inclined surfaces that are inclined toward the separator in a direction away from the first insulating portion.

With this configuration, hitting of the second insulating portion against the protrusions can be suppressed when the fuel cells swing relative to the protrusions.

In the separator supporting structure, the first insulating portion may have a set of bulges respectively expanding toward the protrusions from the lug, and an arc-shaped convex surface may be formed at a bulged end of each of the bulges.

With this configuration, exertion of excessive load on the first insulating portion and the protrusions can be suppressed when the fuel cells swing relative to the protrusions.

In the separator supporting structure, the first insulating portion may have a set of bulges respectively expanding toward the protrusions from the lug, and a flat surface may be formed at a bulged end of each of the bulges. With this configuration, the structure of the first insulating portion can be simplified, which is economically advantageous.

In the separator supporting structure, the second insulating portion may extend outwardly beyond the protrusion ends of the set of protrusions.

With this configuration, the space between the exposed metal portion of each protrusion and that of the separator can be effectively increased.

In the separator supporting structure, outer surfaces of the set of protrusions may be inclined to the recess side toward the protrusion ends of the set of protrusions.

With this configuration, the separator supporting structure can be made compact.

In the separator supporting structure, each of the protrusions may be formed to have a decreasing thickness toward the protrusion end of the protrusion. With this configuration, the separator supporting structure can be made further compact.

Since the present invention provides the second insulating portion extending from the first insulating portion between each protrusion and the separator, it can ensure insulation between the casing and the separator even when an external load is applied to the casing while keeping the cost low.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Separator supporting structures according to the present invention will be described below by illustrating preferred embodiments in connection with a fuel cell system including the same with reference to the accompanying drawings.

Figure 1:
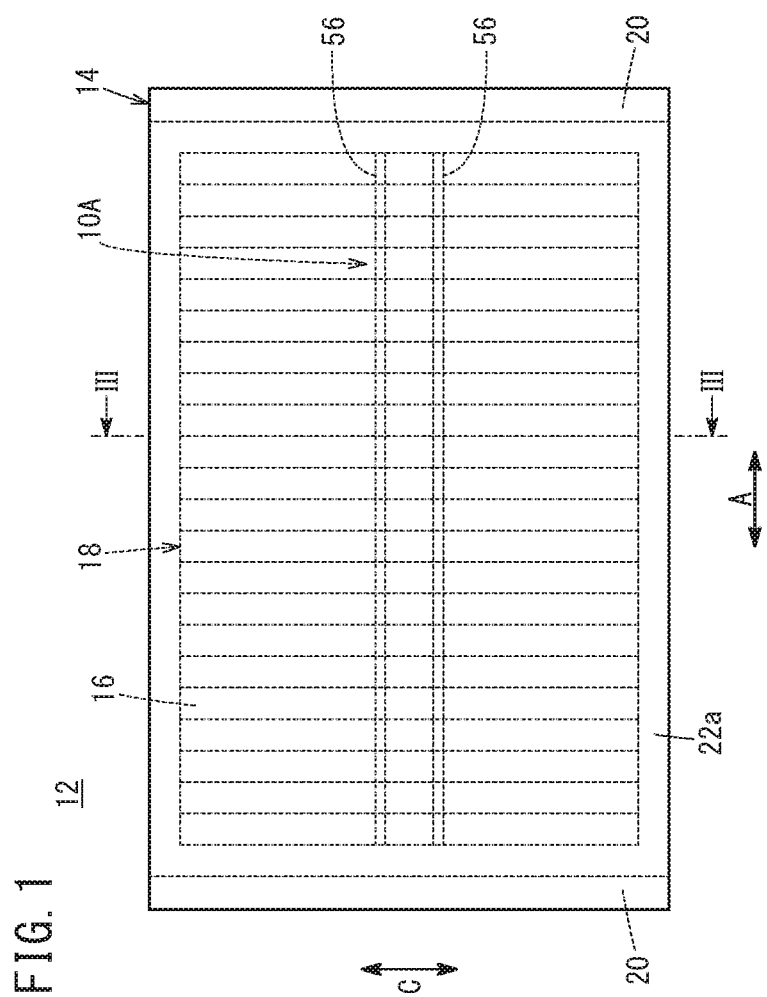
FIG. 1 is a schematic plan view of a fuel cell stack with a separator supporting structure according to an embodiment of the present invention.

As shown in FIG. 1, a separator supporting structure 10A according to an embodiment of the present invention may be used for a fuel cell stack 12 mounted on a fuel cell vehicle, for example. The fuel cell stack 12 includes a casing 14 made of metal having electrical conductivity such as iron, aluminum, or stainless steel, and a fuel cell stack body 18 (a cell laminate) housed in the casing 14 and formed of a stack of multiple fuel cells 16 (power generation cells).

Figure 3:
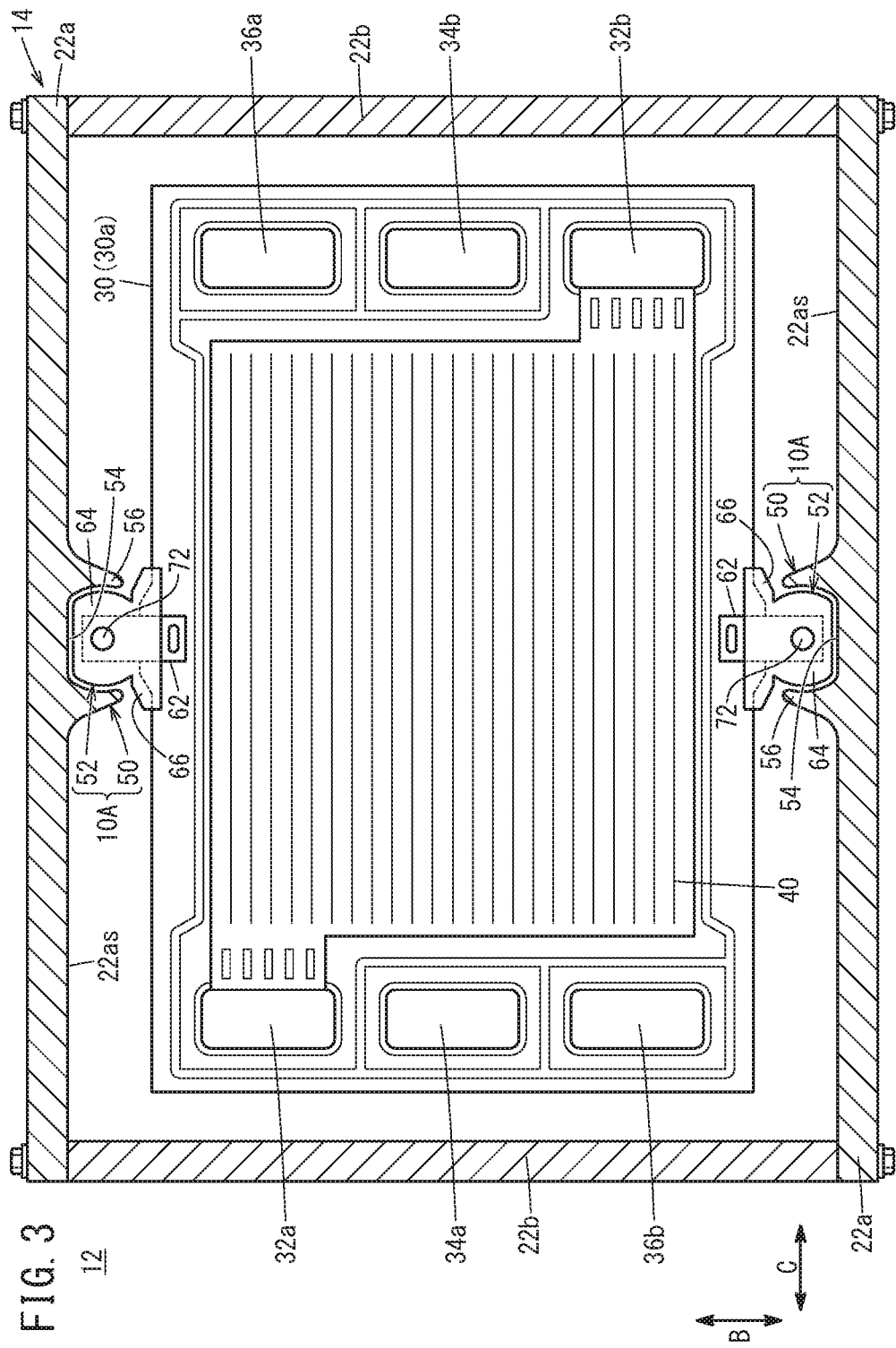
FIG. 3 is a transverse cross-sectional view taken along III-III line in FIG. 1.

In FIGS. 1 and 3, the casing 14 is formed from a set of end plates 20 disposed at both ends in the direction of stacking of the rectangular fuel cells 16 (the direction of arrow A), a set of side panels 22a disposed so as to sandwich the fuel cell stack body 18 in the width direction of the fuel cells 16 (the direction of arrow B), and a set of side panels 22b disposed so as to sandwich the fuel cell stack body 18 in the longitudinal direction of the fuel cells 16 (the direction of arrow C). A hollow tubular member formed by the set of side panels 22a and the set of side panels 22b may be formed as a single piece by casting or extrusion molding.

Figure 2:
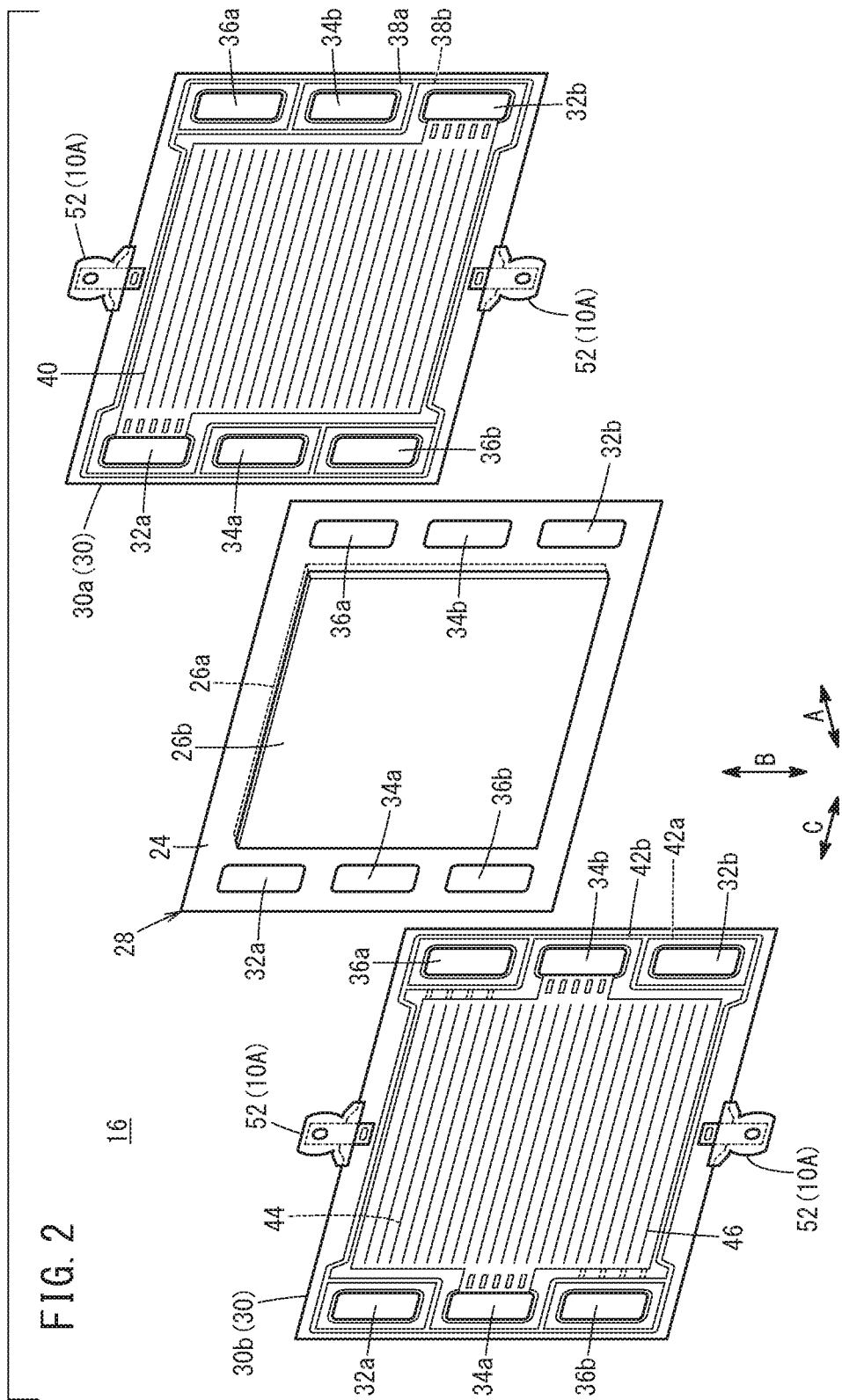
FIG. 2 is an exploded perspective view for describing main components of a fuel cell of FIG. 1.

As shown in FIG. 2, the fuel cells 16 each include an electrolyte membrane electrode assembly (MEA 28) formed from a solid polymer electrolyte membrane 24 sandwiched between a cathode 26a and an anode 26b, and a cathode separator 30a and an anode separator 30b disposed on the opposite sides of the MEA 28.

On one edge portion of the fuel cell 16 in the direction of arrow C, an oxygen-containing gas supply passage 32a, a coolant supply passage 34a, and a fuel gas discharge passage 36b extending respectively in the direction of arrow A are provided. An oxygen-containing gas is supplied through the oxygen-containing gas supply passage 32a, a coolant is supplied through the coolant supply passage 34a, and a fuel gas, for example, hydrogen-containing gas is discharged from the fuel gas discharge passage 36b. The oxygen-containing gas supply passage 32a, the coolant supply passage 34a, and the fuel gas discharge passage 36b are arranged in the direction of arrow B.

On the other edge portion of the fuel cell 16 in the direction of arrow C, a fuel gas supply passage 36a, a coolant discharge passage 34b, and an oxygen-containing gas discharge passage 32b extending respectively in the direction of arrow A are provided. The fuel gas is supplied through the fuel gas supply passage 36a, the coolant is discharged from the coolant discharge passage 34b, and the oxygen-containing gas is discharged from the oxygen-containing gas discharge passage 32b. The fuel gas supply passage 36a, the coolant discharge passage 34b, and the oxygen-containing gas discharge passage 32b are arranged in the direction of arrow B.

On a surface 38a of the cathode separator 30a that faces the MEA 28, an oxygen-containing gas flow field 40 communicating with the oxygen-containing gas supply passage 32a and the oxygen-containing gas discharge passage 32b is provided. The oxygen-containing gas flow field 40 has multiple oxygen-containing gas flow grooves extending in the direction of arrow C.

On a surface 42a of the anode separator 30b that faces the MEA 28, a fuel gas flow field 44 communicating with the fuel gas supply passage 36a and the fuel gas discharge passage 36b is provided. The fuel gas flow field 44 has multiple fuel gas flow field grooves extending in the direction of arrow C.

The cathode separator 30a and the anode separator 30b together form a coolant flow field 46 between the opposing surfaces 38b and 42b. The coolant flow field 46, the coolant supply passage 34a, and the coolant discharge passage 34b have multiple coolant flow field grooves extending in the direction of arrow C.

As shown in FIGS. 2 and 3, the cathode separator 30a and the anode separator 30b are supported to the casing 14 by separator supporting structures 10A respectively provided on the upper and lower longer sides of the cathode separator 30a and the upper and lower longer sides of the anode separator 30b. The longer sides of the cathode separator 30a and the longer sides of the anode separator 30b are free of the oxygen-containing gas supply passage 32a, the oxygen-containing gas discharge passage 32b, the coolant supply passage 34a, the coolant discharge passage 34b, the fuel gas supply passage 36a, and the fuel gas discharge passage 36b. In the description below, the cathode separator 30a and the anode separator 30b will be denoted just as "separator 30" when they are not distinguished.

In this embodiment, the separator 30 is supported on the casing 14 by two separator supporting structures 10A (see FIG. 3). The separator supporting structures 10A each include a casing-side engaging portion 50 provided on an inner surface 22as of each side panel 22a of the casing 14 substantially at the center in the direction of arrow C, and a separator-side engaging portion 52 provided in substantially at the center of the longer side of the separator 30 and engaging with the casing-side engaging portion 50. The casing-side engaging portion 50 may be provided at any number of appropriate positions on the inner surface 22as of each side panel 22a without being limited to only one position at the center of the inner surface 22as of each side panel 22a in the direction of arrow C. Likewise, the separator-side engaging portion 52 may be provided at any number of appropriate positions on each longer side of the separator 30 without being limited to provision at only one position substantially at the center of each longer side of the separator 30.

Figure 4A:
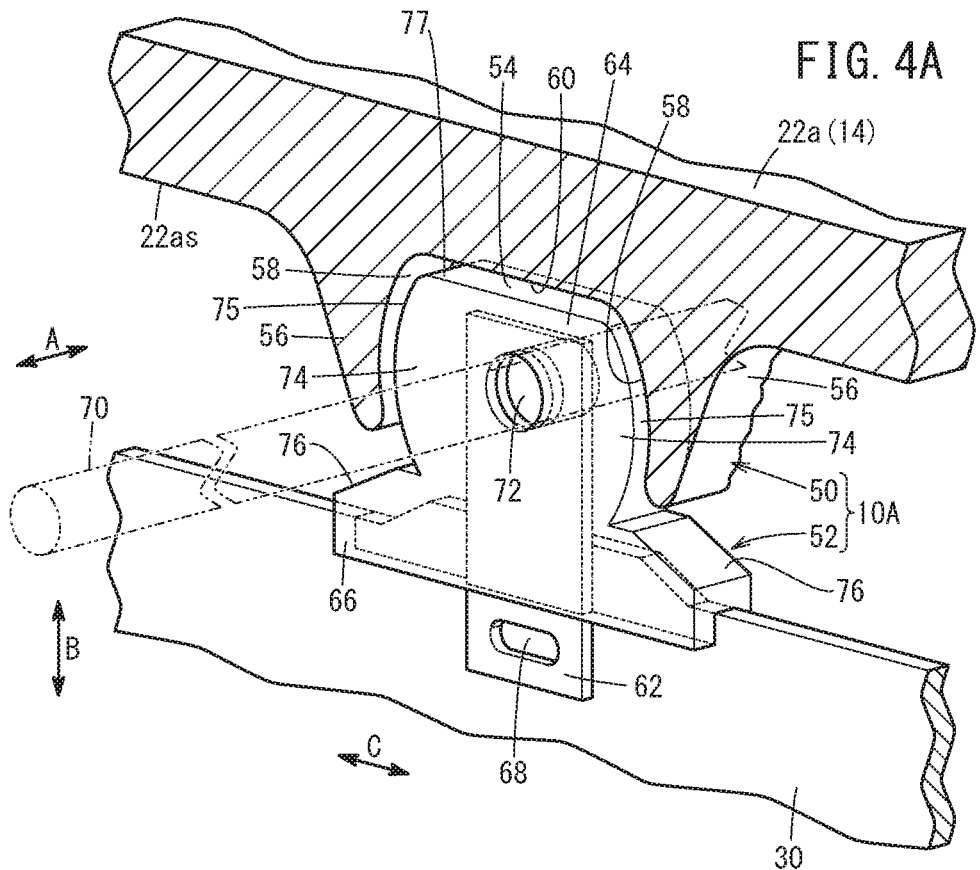
FIG. 4A is a partial cross-sectional enlarged view of the separator supporting structure.

As shown in FIG. 4A, the casing-side engaging portion 50 has a set of protrusions 56 that protrude from the inner surface 22as of the side panel 22a to the side on which the separator 30 is located, to form a recess 54 into which the separator-side engaging portion 52 is inserted.

The protrusions 56 extend almost the entire length of the fuel cell stack body 18 in the stacking direction (the direction of arrow A) (see FIG. 1). The set of protrusions 56 are positioned opposite each other at a certain interval in the direction of arrow C. The opposing surfaces of the protrusions 56 are concave surfaces 58 recessed in an arc shape in the direction away from each other. That is, the recess 54 is formed by a flat surface 60, which is a part of the inner surface 22as of the side panel 22a, and the two concave surfaces 58. The thickness of each protrusion 56 (the dimension along the direction of arrow C) is formed such that it decreases in the direction of protrusion. The protrusions 56 and the inner surface 22as of the side panel 22a are exposed metal portions in their entirety. That is, no insulating material is provided on the inner surface of the casing 14 and thus the inner surface of the casing 14 does not have insulating property.

Outer surfaces of the set of protrusions 56 are inclined to the recess 54 side toward the protrusion ends (that is, to the side on which the separator 30 is located). Each of the protrusions 56 is formed to have a decreasing thickness toward its protrusion end.

The separator-side engaging portion 52 has a metal lug 62 provided on the separator 30 so as to protrude outwardly from the outer periphery of the separator 30, a first insulating portion 64 provided on the lug 62, and a second insulating portion 66 extending between each protrusion 56 and the separator 30 from the first insulating portion 64.

The lug 62 is a rectangular plate member made from a material similar to the separator 30 and is joined to the separator 30 by, for example, welding or brazing.

In this embodiment, a joint hole 68 (a long hole) is formed in proximal end of the lug 62. In the protrusion tip of the lug 62 and the first insulating portion 64, a positioning hole 72 for insertion of a rod 70 used for positioning the fuel cells 16 during manufacture of the fuel cell stack 12 is formed. The rod 70 may be removed from the positioning hole 72 after the manufacture of the fuel cell stack 12 or may be left in the positioning hole 72. The rod 70 is preferably made from material having insulating property.

The first insulating portion 64 is made of resin material having insulating property. The first insulating portion 64 covers the entire surface of the lug 62 on the protrusion-end side. In other words, the protrusion-end side of the lug 62 is molded with resin by the first insulating portion 64. A portion of the inner surface of the lug 62 that forms the positioning hole 72 may or may not have the first insulating portion 64 thereon.

The outer shape of the first insulating portion 64 corresponds to the shape of the recess 54. That is, the first insulating portion 64 has a set of bulges 74 respectively protruding toward the protrusions 56 from the lug 62. The bulged end of each bulge 74 is formed by an arc-shaped convex surface 75. For allowing movement relative to each other, the convex surface 75 and the concave surface 58 provide a sufficient gap therebetween. The first insulating portion 64 has a flat surface 77 facing the flat surface 60.

The second insulating portion 66 is provided integrally with the first insulating portion 64. Specifically, the second insulating portion 66 covers the proximal side of the lug 62 and the central portion of the longer side edge of the separator 30. In other words, the proximal side of the lug 62 and the central portion of the longer side edge of the separator 30 are molded with resin by the second insulating portion 66. The proximal end of the lug 62 is not covered with the second insulating portion 66.

Surfaces of the second insulating portion 66 that face the protrusion ends of the protrusions 56 are inclined surfaces 76 that are inclined to the side on which the separator 30 is located in a direction away from the first insulating portion 64. The clearance between the inclined surface 76 and the protrusion end of the protrusion 56 as well as the inclination angle of the inclined surface 76 are adjusted so that the inclined surface 76 does not hit the protrusion 56 when the separator 30 swings relative to the protrusion 56 (tilts in the direction of arrow C). The length of the second insulating portion 66 along the direction of arrow C is longer than the distance between the protrusion ends of the set of protrusions 56. In other words, the second insulating portion 66 extends outwardly beyond the protrusion ends of the protrusions 56, that is, extends laterally on the separator 30 (to the side of the side panel 22b).

The fuel cell stack 12 according to this embodiment thus configured may often receive an external load in the direction of arrow C in addition to sway and vibration especially when used on a vehicle. In such an occasion, misalignment of the fuel cells 16 relative to the casing 14 is suppressed because the fuel cells 16 are supported to the casing 14 by the separator supporting structures 10A.

The separator supporting structure 10A according to this embodiment provides the following advantages.

The separator supporting structure 10A includes: a metal lug 62 provided on the separator 30 so as to protrude outwardly from an outer periphery of the separator 30; a set of protrusions 56 that protrude from an inner surface 22as of a casing 14 toward the separator 30 and form a recess 54 into which the lug 62 is inserted; a first insulating portion 64 covering the lug 62 at least in the recess 54; and a second insulating portion 66 extending from the first insulating portion 64 to positions between each of the protrusions 56 and the separator 30.

Figure 4B:
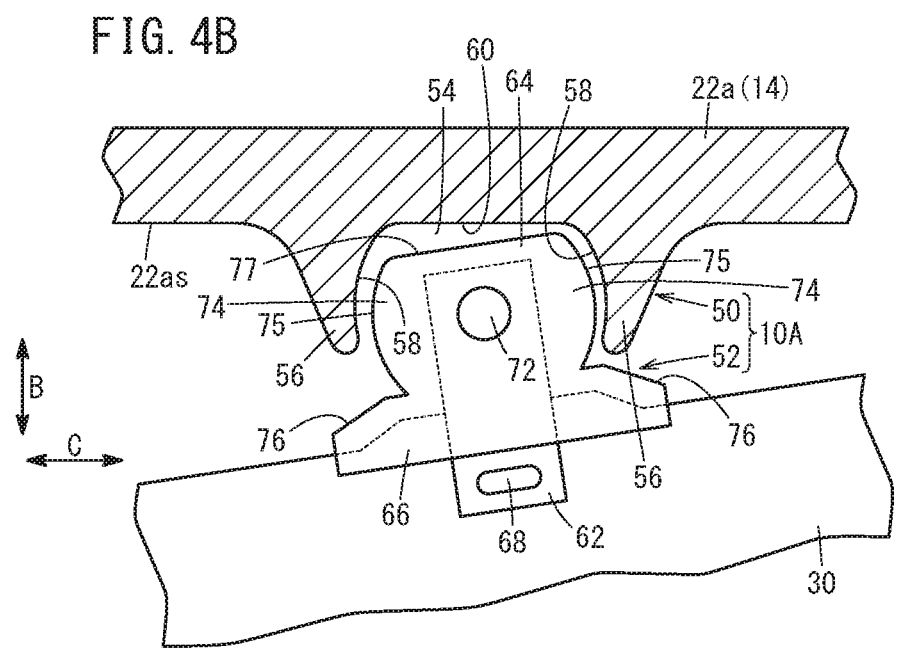
FIG. 4B is a partial cross-sectional enlarged view showing a separator swinging relative to protrusions.

With this arrangement, due to the second insulating portion 66, there will be a larger space between the exposed metal portion of each protrusion 56 and that of the separator 30 when an external load is applied to the casing 14 to cause the fuel cells 16 to swing relative to the protrusions 56 as shown in FIG. 4B, compared to a case where the second insulating portion 66 is not provided. Thus, an appropriate insulation distance (a space) can be ensured between the protrusions 56 and the separator 30 even when the fuel cells 16 swing relative to the protrusions 56. Accordingly, insulation between the casing 14 and the separator 30 can be ensured. In addition, the cost can be kept low since the area covered with an insulator can be small compared to the case where an insulator is provided on a wide range of the inner surface of the casing 14.

The first insulating portion 64 covers the protrusion-end side of the lug 62, and the second insulating portion 66 covers the proximal side of the lug 62 and part of the edge of the separator 30. With this configuration, the insulation between the casing 14 and the separator 30 can be ensured more reliably.

The lug 62 is joined to the separator 30. This can decrease the amount of the material for the outer periphery of the separator 30 that is removed during manufacture of the separator 30, so the material cost can be reduced.

Surfaces of the second insulating portion 66 that face the protrusion ends of the protrusions 56 are inclined surfaces 76 that are inclined to the side on which the separator 30 is located in a direction away from the first insulating portion 64. With this configuration, hitting of the second insulating portion 66 against the protrusions 56 is suppressed when the convex surface 75 smoothly swings along the concave surface 58 (that is, the fuel cells 16 swing relative to the protrusions 56).

The first insulating portion 64 has a set of bulges 74 respectively expanding toward the protrusions 56 from the lug 62, and the bulged end of each of the bulges 74 is formed by an arc-shaped convex surface 75. With this configuration, exertion of excessive load on the first insulating portion 64 can be suppressed when the fuel cells 16 swing relative to the protrusions 56.

The second insulating portion 66 extends outwardly beyond the protrusion ends of the set of protrusions 56. This can effectively increase the space between the exposed metal portion of each protrusion 56 and that of the separator 30.

Outer surfaces of the set of protrusions 56 are inclined to the recess 54 side toward the protrusion ends; thus, the separator supporting structure 10A can be made compact. Each of the protrusions 56 is formed to have a decreasing thickness toward its protrusion end; thus the separator supporting structure 10A could be made further compact.

Next, separator supporting structures 10B to 10D according to first to third modifications will be described.

Figure 5A:
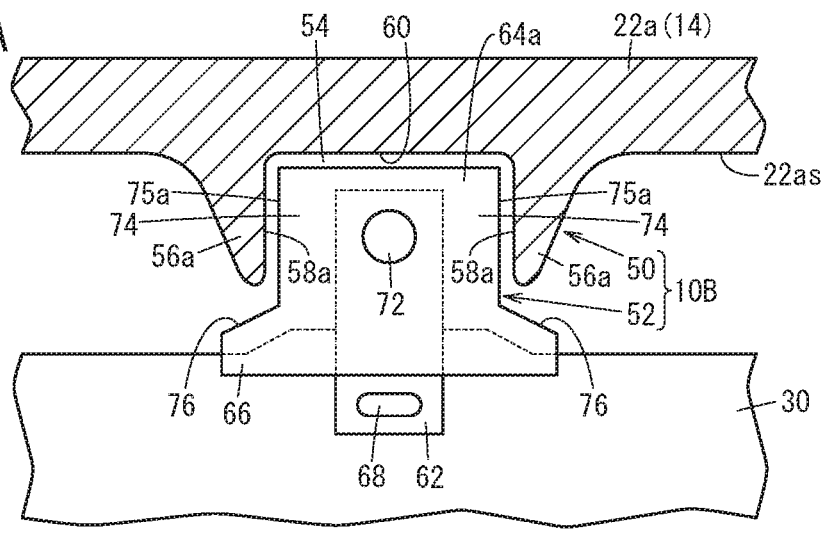
FIG. 5A is a view illustrative of the separator supporting structures according to a first modification.

In the separator supporting structure 10B according to the first modification shown in FIG. 5A, a flat surface 75a linearly extending along the protruding direction of the lug 62 (the direction of arrow B) is formed at the bulged end of each of the bulges 74 of a first insulating portion 64a. That is, the flat surfaces 75a are formed on both sides of the first insulating portion 64a. The opposing surfaces of protrusions 56a are formed as flat surfaces 58a parallel to the flat surfaces 75a. With this configuration, the structures of the first insulating portion 64a and the protrusions 56a can be simplified.

Figure 5B:
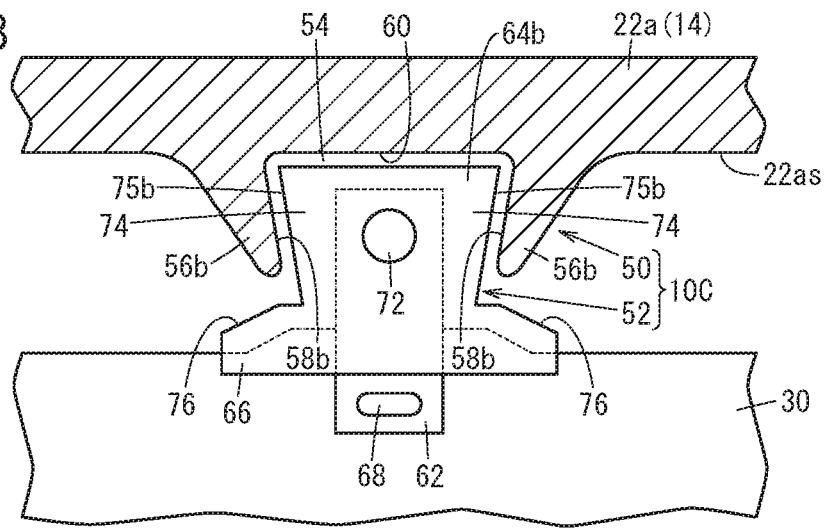
FIG. 5B is a view illustrative of the separator supporting structures according to a second modification.

In the separator supporting structure 10C according to the second modification shown in FIG. 5B, a flat surface 75b inclined to the side on which the lug 62 is located toward the second insulating portion 66 is formed at the bulged end of each of the bulges 74 of a first insulating portion 64b. That is, the flat surfaces 75b are formed on both sides of the first insulating portion 64b. The opposing surfaces of protrusions 56b are formed as flat surfaces 58b parallel to the flat surfaces 75b. That is, the flat surfaces 58b are inclined from the flat surface 60 to the side on which the lug 62 is located and toward the side on which the separator 30 is located. However, the flat surfaces 58b may extend straight toward the side on which the separator 30 is located (that is, parallel to the lug 62) instead of being inclined. Such a configuration still provides similar advantages to those of the separator supporting structure 10B described above.

Figure 5C:
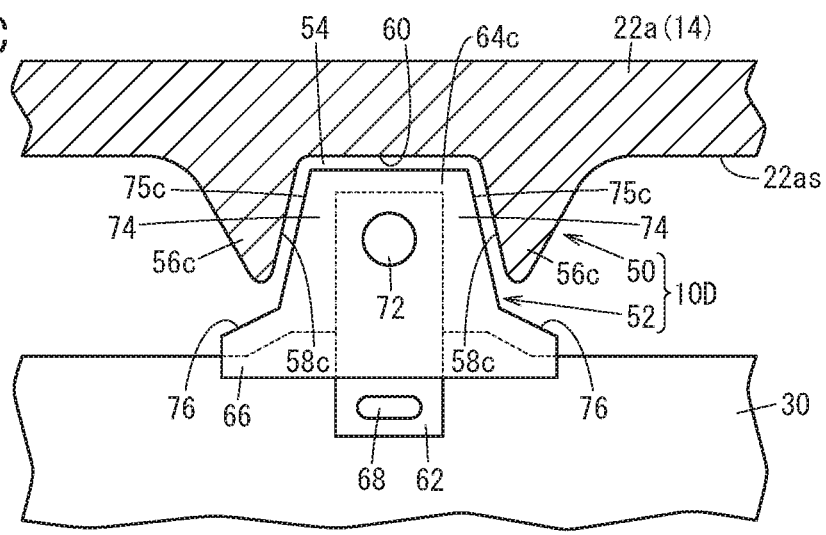
FIG. 5C is a view illustrative of the separator supporting structures according to a third modification.

In the separator supporting structure 10D according to the third modification shown in FIG. 5C, a flat surface 75c inclined away from the lug 62 toward the second insulating portion 66 is formed at the bulged end of each of the bulges 74 of a first insulating portion 64c. That is, the flat surfaces 75c are formed on both sides of the first insulating portion 64c. The opposing surfaces of protrusions 56c are formed as flat surfaces 58c parallel to the flat surfaces 75c. That is, the flat surfaces 58c are inclined from the flat surface 60 away from the lug 62 and toward the side on which the separator 30 is located. However, the flat surfaces 58c may extend straight toward the side on which the separator 30 is located (that is, parallel to the lug 62) instead of being inclined. Such a configuration still provides similar advantages to those of the separator supporting structure 10B described above.

The present invention is not limited to the above-described configurations. The lug 62 may be integral with the separator 30, in which case the lug 62 is press-molded integrally with the separator 30. The separator supporting structures 10A to 10D may be provided at certain multiple positions on the longer sides of the separator 30.

It will be appreciated that the separator supporting structures according to the present invention can employ various further configurations without departing from the scope of the present invention in addition to the embodiments described above.

What is claimed is:

1. A separator supporting structure for supporting a metal separator for fuel cells to a metal casing housing the fuel cells, the separator supporting structure comprising:
   a metal lug provided on the separator so as to protrude outwardly from an outer periphery of the separator;
   a set of protrusions that protrude from an inner surface of the casing toward the separator to form a recess into which the lug is inserted;
   a first insulating portion covering the lug at least in the recess; and
   a second insulating portion extending from the first insulating portion and between the separator and each of the protrusions.

2. The separator supporting structure according to claim 1, wherein
   the first insulating portion covers a protrusion-end side of the lug, and
   the second insulating portion covers a proximal side of the lug and part of an edge of the separator.

3. The separator supporting structure according to claim 1, wherein the lug is joined to the separator.

4. The separator supporting structure according to claim 1, wherein in the second insulating portion surfaces that face protrusion ends of the protrusions are inclined surfaces that are inclined toward the separator in a direction away from the first insulating portion.

5. The separator supporting structure according to claim 1, wherein
   the first insulating portion has a set of bulges respectively expanding toward the protrusions from the lug, and
   an arc-shaped convex surface is formed at a bulged end of each of the bulges.

6. The separator supporting structure according to claim 1, wherein
   the first insulating portion has a set of bulges respectively expanding toward the protrusions from the lug, and
   a flat surface is formed at a bulged end of each of the bulges.

7. The separator supporting structure according to claim 1, wherein the second insulating portion extends outwardly beyond the protrusion ends of the set of protrusions.

8. The separator supporting structure according to claim 1, wherein outer surfaces of the set of protrusions are inclined to a recess side toward the protrusion ends of the protrusions.

9. The separator supporting structure according to claim 8, wherein each of the protrusions is formed to have a decreasing thickness toward the protrusion end of the protrusion.

* * * * *